(12) United States Patent
Lopez et al.

(10) Patent No.: US 11,303,608 B2
(45) Date of Patent: Apr. 12, 2022

(54) DYNAMIC PINPAD IP ADDRESS ASSIGNMENT IN POINT OF SALE ENVIRONMENTS

(71) Applicant: Toshiba Global Commerce Solutions Holdings Corporation, Tokyo (JP)

(72) Inventors: Luis Lopez, Durham, NC (US); Juan Eduardo Ramirez Lopez, Tlaquepaque (MX); Gerardo Mijares Saenz, Zapopan (MX); Roberto Israel Varela Hernandez, Zapopan (MX)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 185 days.

(21) Appl. No.: 16/713,093

(22) Filed: Dec. 13, 2019

(65) Prior Publication Data

US 2021/0185004 A1 Jun. 17, 2021

(51) Int. Cl.
| | | |
|---|---|---|
| *G06Q 20/40* | (2012.01) | |
| *G06Q 20/20* | (2012.01) | |
| *H04L 61/5014* | (2022.01) | |
| *H04L 61/5092* | (2022.01) | |
| *G06Q 20/32* | (2012.01) | |

(52) U.S. Cl.
CPC ......... *H04L 61/2015* (2013.01); *G06Q 20/20* (2013.01); *G06Q 20/32* (2013.01); *G06Q 20/40* (2013.01); *H04L 61/2092* (2013.01)

(58) Field of Classification Search
None
See application file for complete search history.

(56) References Cited

U.S. PATENT DOCUMENTS

| | | | | |
|---|---|---|---|---|
| 2005/0228887 | A1* | 10/2005 | Wang | ................ H04L 29/12207 709/227 |
| 2005/0268003 | A1* | 12/2005 | Wang | .................. H04L 61/2015 710/36 |
| 2016/0219024 | A1* | 7/2016 | Verzun | ...................... H04L 9/34 |
| 2020/0092251 | A1* | 3/2020 | Peterson | ............. H04L 41/0213 |

* cited by examiner

*Primary Examiner* — Ajit Patel
(74) *Attorney, Agent, or Firm* — Coats + Bennett, PLLC (57) ABSTRACT

A Point of Sale (POS) terminal in a semi-integrated payment system generates an IP address for a peripheral device, such as a Personal Identity Number (PIN) pad, for example, that is communicatively connected to the POS terminal. The POS terminal also generates an IP Configuration message that includes the generated IP address and sends the message to the peripheral device. This configures the peripheral device to securely communicate user data with one or more POS nodes in a POS network while bypassing the POS terminal.

20 Claims, 5 Drawing Sheets

DYNAMIC PINPAD IP ADDRESS ASSIGNMENT IN POINT OF SALE ENVIRONMENTS

TECHNICAL FIELD

The present disclosure relates generally to point-of-sale (POS) systems for retail stores, and more particularly to POS systems for dynamically assigning IP addresses to peripheral devices.

BACKGROUND

To facilitate customer payments, retail merchants typically use either a fully-integrated payment system or a semi-integrated payment system. In both systems, sensitive customer data (e.g., credit card data) is sent to the merchants' payment processing center via a Point-of-Sale (POS) network. However, there are some differences in how such data is communicated. For example, with fully-integrated payment systems, a Personal Identity Number (PIN) pad is directly connected to a POS terminal—not the POS network. So connected, any data communicated between the PIN pad and the POS network, including the customers' sensitive data, first passes through the POS terminal. This means that the PIN pad does not require its own unique IP address because the POS terminal is the device that communicates with the POS network.

With semi-integrated payment solutions, the PIN pads are still connected to the POS terminal; however, they are also directly connected to the POS network. This allows the PIN pad to send the customers' sensitive data directly to the merchants' payment processing centers (e.g., a payment switch) in the POS network without first having to route the data through the POS terminal. However, it also means that the PIN pad requires its own unique IP address.

DETAILED DESCRIPTION

The present disclosure provide a Point-of-Sale (POS) terminal, a method implemented by the POS terminal, and a corresponding non-transitory, computer-readable storage medium for dynamically assigning IP addresses to one or more peripheral devices, such as a Personal Identity Number (PIN) pads, for example, connected to the POS terminal. The embodiments described herein may be advantageously implemented in a semi-integrated payment system used by a merchant, and are particularly beneficial in situations where the merchant is transitioning from using a fully-integrated payment system to a semi-integrated payment system.

In more detail, PIN pads connected to POS terminals communicate sensitive user data (e.g., credit card data) with a node in a POS network regardless of whether the PIN pad is part of a fully-integrated payment system or a semi-integrated payment system. However, PIN pads in fully-integrated payment systems communicate sensitive data with the POS network via the POS terminals, and thus, they do not require their own IP address. The PIN pads in semi-integrated payment systems, however, can communicate sensitive data directly with a node in the POS network (i.e., without going through the POS terminals), and therefore, require their own assigned IP addresses.

Conventionally, to effect communication in semi-integrated payment systems, merchants assign unique IP addresses to the PIN pads using either a manual process in which an operator manually assigns an IP address to each individual PIN pad, or by using a Dynamic Host Configuration Protocol (DHCP) server. However, both conventional methods are problematic, and neither works well in situations where the merchant is transitioning their payment system from a fully-integrated solution to a semi-integrated solution.

Particularly, large merchants operate a large number of stores, and thus, generally have a very large number of PIN pads. Indeed, the number of PIN pads for merchants that sell nationally or even worldwide can number in the tens of thousands or more. To make matters worse, PIN pads are distributed, in many cases, over a large geographical area. This makes the process of manually assigning an IP address to each PIN pad difficult, time-consuming, and expensive for the merchants. Using an existing DHCP server may negate the need for manually assigning an IP address to each PIN pad, but in many cases, the DHCP servers are not configured to provide the IP addresses to PIN pads. Additional DCHP servers could be added to the POS network specifically for the PIN pads. However, doing so is expensive and increases security risks. Therefore, merchants are typically unwilling to approve such measures.

Accordingly, embodiments of the present disclosure address such situations. In doing so, the present embodiments beneficially eliminate the need for merchants to manually assign the IP addresses to each PIN pad in their system, as well as the need to add more DHCP servers to the POS network. More particularly, a POS terminal configured according to the present disclosure dynamically calculates an IP address for the PIN pad that is connected to it, and sends that IP address to the PIN pad in an IP Configuration message. This configures the PIN pad to bypass the POS terminal and securely communicate sensitive data it receives from a customer directly to a network node in a POS network.

Figure 1:
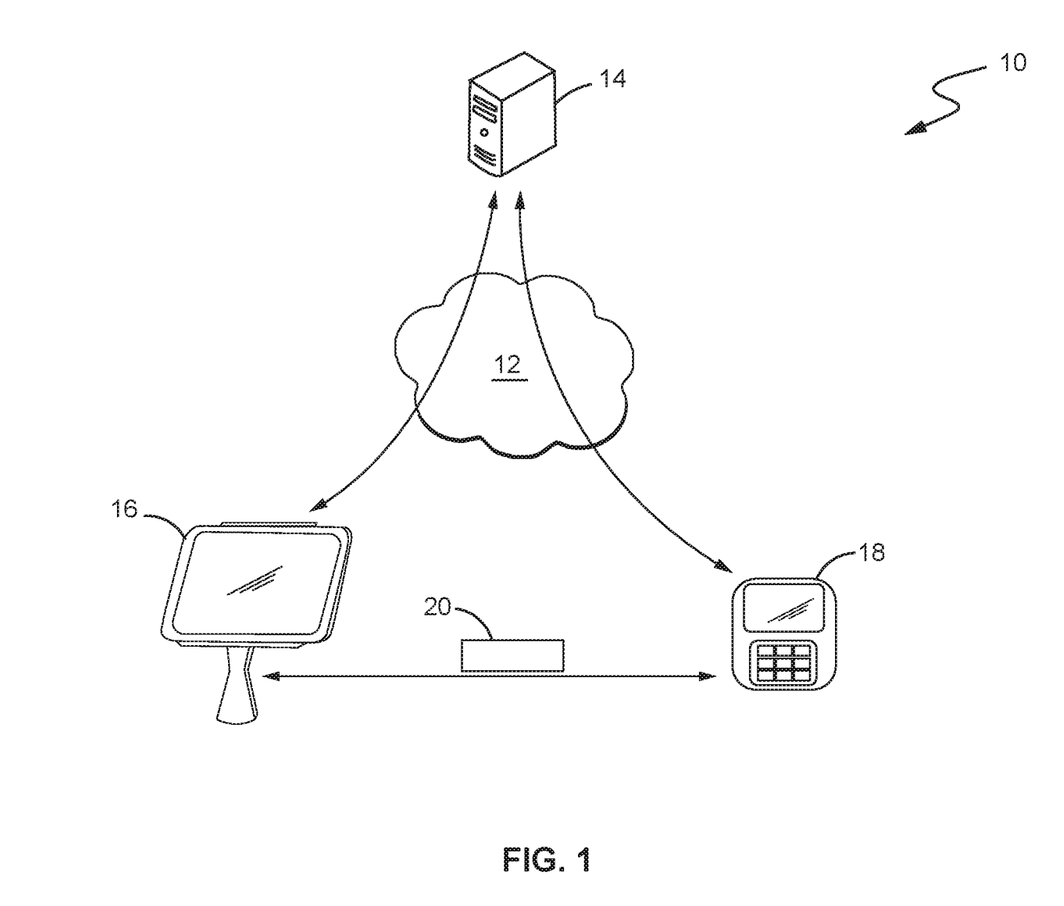
FIG. 1 is a block diagram illustrating a Point-of-Sale (POS) network and some corresponding components according to one embodiment of the present disclosure.

Turning now to the drawings, FIG. 1 is a block diagram illustrating some components of a semi-integrated POS system 10 configured according to one embodiment of the present disclosure. As seen in FIG. 1, POS system 10 comprises a packet data network 12 that communicatively interconnects a POS node 14 (e.g., a payment switch), a POS terminal 16, and a peripheral device (e.g., a PIN pad) 18.

The packet data network 12 comprises one or more private and/or public packet data networks, such as the Internet, for example, and carries data in packets between nodes. Both the POS terminal 16 and the peripheral device 18 are separately configured to communicate directly with the POS node 14, which may, for example, be a payment switch. Although not specifically shown in the figures, the POS node 14 may connect, as is known in the art, to a POS payment processor (e.g., a bank).

As previously stated, a POS terminal 16 configured to operate according to the present embodiments configures the peripheral device 18 to be able to communicate sensitive data to the POS node 14 via network 12. To accomplish this function, the POS terminal 16 dynamically generates an IP address for the peripheral device 18, and sends the IP address to the peripheral device 18 in an IP Configuration message 20. Upon receiving the IP Configuration message 20, the peripheral device 18 uses the information in the message to send messages to, and receive messages from, POS node 14.

Figure 2:
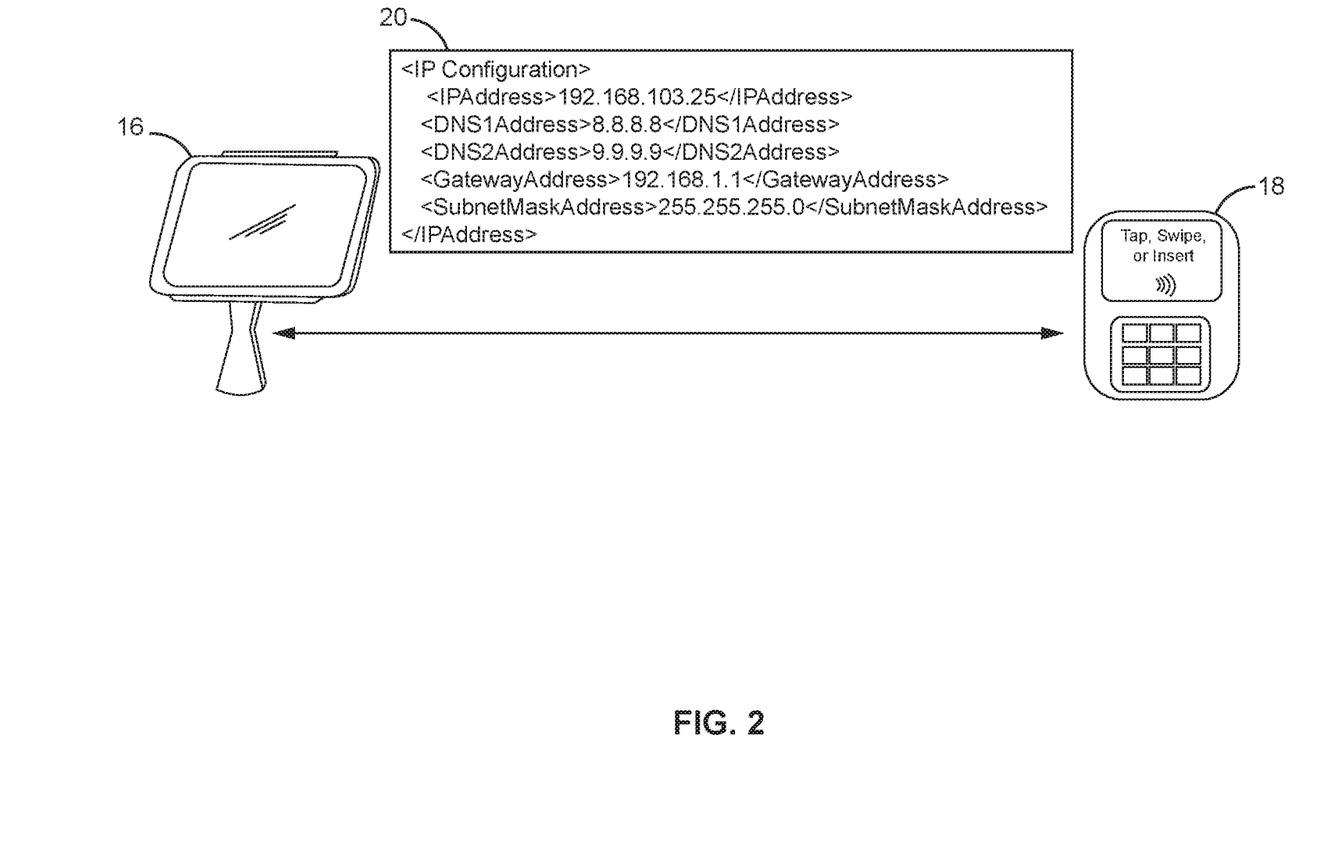
FIG. 2 is a block diagram illustrating the communication of an IP configuration message between the POS terminal and a peripheral device connected to the POS terminal according to one embodiment of the present disclosure.

FIG. 2 illustrates an IP Configuration message 20 generated by POS terminal 16, and sent to peripheral device 18 according to one embodiment of the present disclosure. The peripheral device 18, in this embodiment, is a PIN pad. However, those of ordinary skill in the art will readily appreciate that depicting peripheral device 18 as a PIN pad is for illustrative purposes only, and that the present disclosure is not so limited. Peripheral device 18 may be any device operatively connected to the POS terminal 16 that is intended to securely communicate data with a node in POS network 12.

As seen in FIG. 2, the IP Configuration message 20 that is sent to peripheral device 18 is generated by POS terminal 16 according to the eXtended Hypertext Language (XML) format, although other formats are also possible. Message 20 is generated, according to the present embodiments, to include network information needed by peripheral device 18 to securely communicate user data with one or more POS nodes 14 in POS network 12. Such information may include, but is not limited to, the addresses of the various Domain Name Servers (DNSs) and Gateways (GWs), as well as a subnet mask addresses for separating IP addresses into a network address and a host address.

IP Configuration message 20 is generated to also include an IP address to be assigned to the peripheral device 18. In one embodiment, the POS terminal 16 dynamically calculates the IP address to be assigned to the peripheral device 18 as a function of its own currently assigned IP address and a "pseudo" IP address. In more detail, POS terminal 16 is configured to determine its own IP address as assigned by a DHCP server, for example. POS terminal 16 is further configured to determine a pseudo IP address. In the context of the present disclosure, a "pseudo" IP address need not be a valid IP address. Rather, the pseudo IP address is an offset value (e.g., a "dummy" IP address) formatted according to IPv4 or IPv6, for example.

To calculate the IP address for the peripheral device 18, one embodiment of the present disclosure performs a mathematical function by adding the pseudo IP address to the IP address currently assigned to POS terminal 16, as seen below in equation (1).

$$192.168.003.25 + 000.000.100.00 \tag{1}$$

This results in an IP address of 192.168.103.25 that is then sent to peripheral device 18 in the IP configuration message 20 along with the other network information. Upon receipt of message 20, peripheral device 18 is configured to securely send data, such as the user's credit card data obtained at peripheral device 18, to one or more POS nodes 14 in POS network 12 without having to communicate that data through POS terminal 16.

Figure 3:
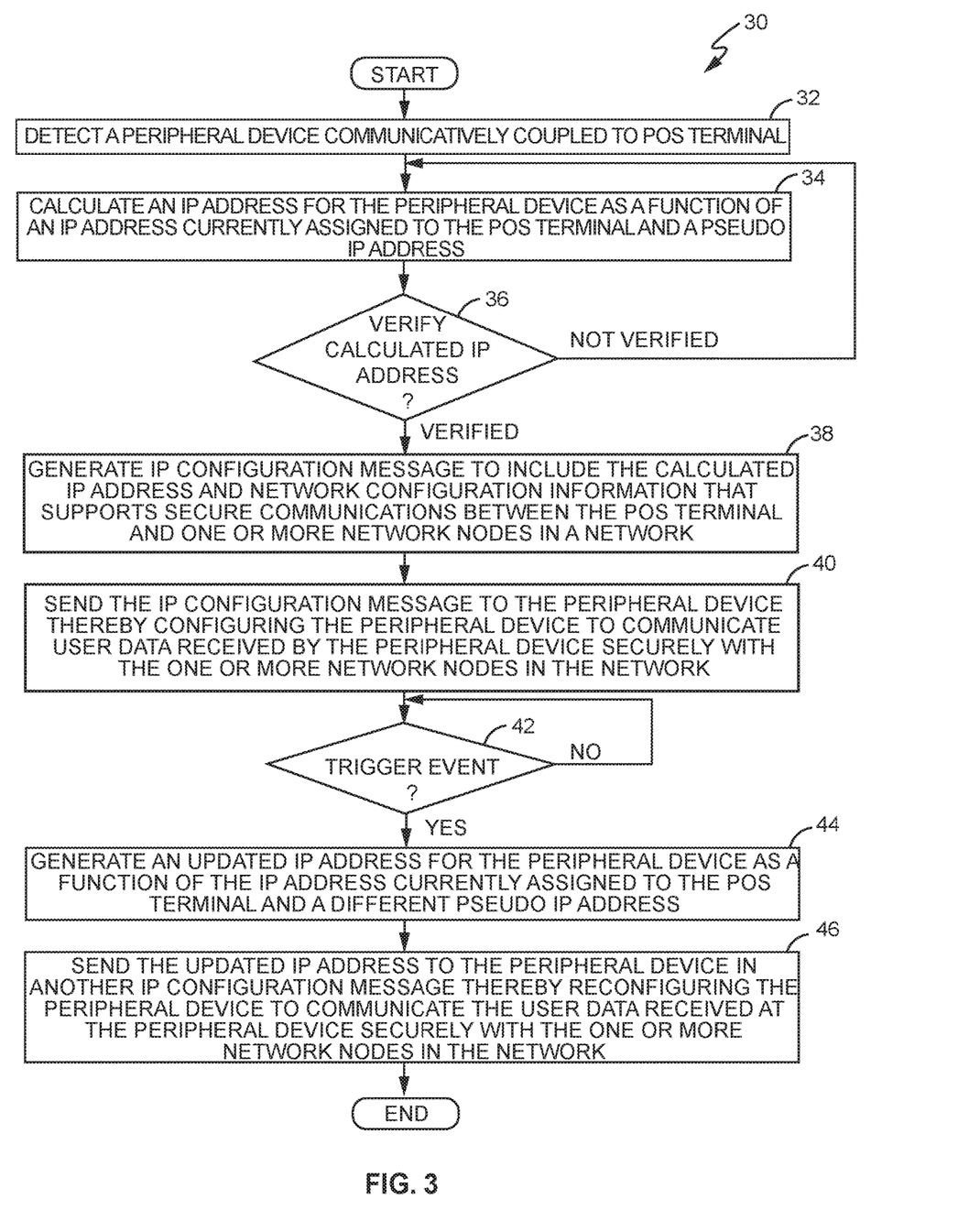
FIG. 3 is a flow diagram illustrating a method for dynamically assigning an IP address to a peripheral device (e.g., a PIN pad), according to one embodiment of the present disclosure.

FIG. 3 is a flow diagram illustrating a method 30 for dynamically assigning an IP address to peripheral device 18, according to one embodiment of the present disclosure. Method 30 is implemented by POS terminal 16 and begins with the POS terminal 16 detecting that peripheral device 18 has been communicatively coupled to the POS terminal 16 (box 32). Such connections may be via a physical connection, such as a USB or other cabling, or via wireless connections, such as BLUETOOTH or WiFi. Regardless of the type of connection, however, the methods by which POS terminal 16 detects when a peripheral device 18 is connected are well-known, and thus, not described in detail here.

Responsive to detecting that peripheral device 18 is communicatively coupled, POS terminal 16 is triggered to calculate the dynamic IP address to be assigned to peripheral device 18 as a function of the IP address currently assigned to POS terminal 16 and the pseudo IP address (box 34). As previously stated, the pseudo IP address is an offset value formatted according to IPv4 or IPv6, for example, and may be randomly generated, in whole or in part, or may be a predetermined value provisioned by an operator of the retail store. In this embodiment, the pseudo IP address is added to the IP address currently assigned to POS terminal 16 in order to generate the IP address for peripheral device 18.

POS terminal 16 then verifies whether the calculated IP address falls within a predetermined range of valid IP addresses for the peripheral device (box 36). Failure to verify the IP address as being a "valid" IP address causes POS terminal 16 to repeat the calculation with another pseudo IP value. However, provided that the calculated IP address is verified, POS terminal 16 generates IP Configuration message 20 to include both the newly-calculated IP address and any network configuration information that supports secure communications between the POS terminal 16 and one or more POS nodes in POS network 12 (box 38). POS terminal 16 then sends IP Configuration message 20 to peripheral device 18 thereby configuring peripheral device 18 to communicate the user data received by peripheral device 18 securely with one or more POS nodes 14 in POS network 12. That is, when a customer "swipes" or "inserts" his/her credit card in peripheral device 18, or otherwise provides peripheral device 18 with his/her user data, peripheral device 18 can send that data to POS node 14 in a secure manner without having to communicate that data through POS terminal 16. Similarly, peripheral device 18 can also receive data messages from POS node 14 directly without having to use POS terminal 16 as an intermediary communication device From time-to-time, there may be a need to change peripheral devices 18, or to reconfigure peripheral devices 18 with new network information. Therefore, according to the present embodiments, POS terminal 16 is configured to automatically perform these functions responsive to detecting a predetermined trigger event (box 42). Such trigger events may include, but are not limited to, the disconnection of one peripheral device 18 followed by the subsequent connection of another peripheral device 18, the receipt of an explicit request for a new IP address from an operator (e.g., a store employee) or peripheral device 18 (e.g., sent in response to reaching a predetermined number of failed attempts to establish communications and/or communicate with POS node 14 using its dynamically assigned IP address), the expiration of a predetermined timer (e.g., for cases where an IP address may be periodically changed for security purposes), or upon the POS terminal 16 receiving a new or updated IP address or network configuration message.

Regardless of the particular trigger event, however, POS terminal 16 is configured according to the present embodiments to automatically generate an updated IP address for peripheral device 18 responsive to detecting the trigger event (box 44), and send the updated IP address, along with any other network configuration information, in another IP Configuration message 20 to peripheral device 18 (box 46). Once received, peripheral device 18 reconfigures itself to communicate the user data it receives securely with the one or more POS nodes 14 in POS network 12.

Figure 4:
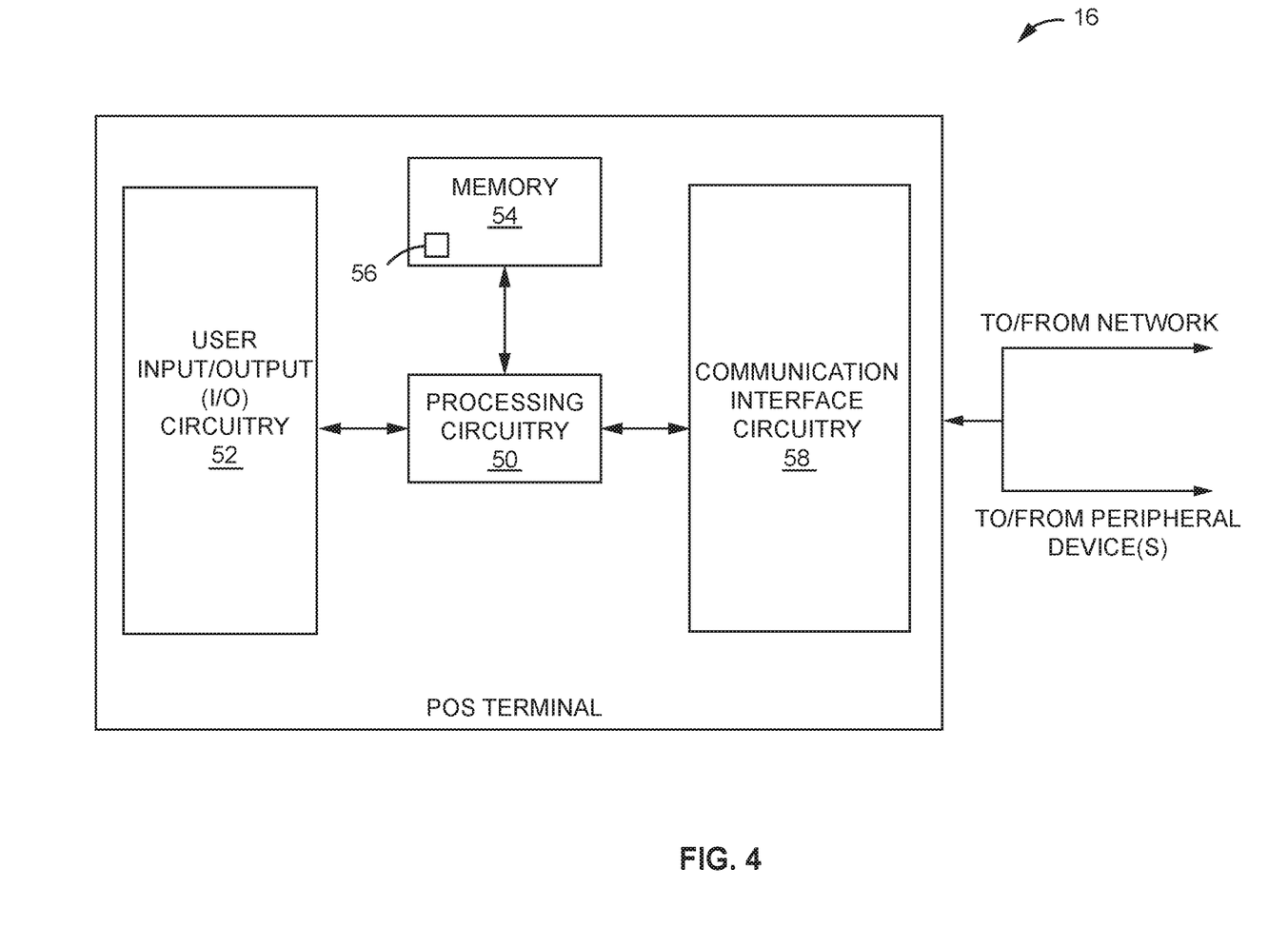
FIG. 4 is a functional block diagram illustrating a POS terminal configured according to one embodiment of the present disclosure.

FIG. 4 is a functional block diagram illustrating some main functional components of a POS terminal 16 configured according to one embodiment of the present disclosure. As seen in FIG. 4, POS terminal 16 comprises processing circuitry 50, a user input/output (I/O) interface 52, a memory 54 configured to store a control application 56, and communications interface circuitry 58.

Processing circuitry 50, which in some embodiments may comprise a plurality of separate processor circuits, may comprise any sequential state machine operative to execute machine instructions stored as machine-readable computer programs in the memory 54, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. Processing circuitry 50 is generally configured to control the operations and functions of POS terminal 16 according to the data and instructions stored in memory 54. This includes being controlled to perform the previously described functions in accordance with the code and logic comprising control application 56.

In particular, according to the present embodiments, processing circuitry 50 is controlled to, inter alia, calculate an IP address for the peripheral device as a function of the IP address currently assigned to the POS terminal and a randomly-generated or predetermined pseudo IP address, and then generate IP configuration message 20 to include the calculated IP address and network configuration information that supports secure communications between the POS terminal 16 and one or more POS nodes 14. Once generated, processing circuitry 50 is configured to send IP configuration message 20 to peripheral device 18, thereby configuring that device to communicate user data it receives securely with POS node 14.

The User I/O interface 52 comprises one or more devices that allow a customer or other user to interact with, and control the operation of, POS terminal 16 in accordance with the present embodiments. Such devices include, but are not limited to, display devices (including those with a touch-screen), keyboards, keypads, a mouse, trackball, and the like.

The memory 54 is operatively connected to processing circuitry 50 and may comprise any non-transitory machine-readable media known in the art. Such media includes, but is not limited to, SRAM, DRAM, DDRAM, ROM, PROM, EPROM, Flash memory, and the like. As stated above, memory 54 stores the control application 56 that, when executed by processing circuitry 50, configures POS terminal 16 to perform the functions previously described. In one embodiment, memory 54 comprises memory that is positioned on the inside of POS terminal 16. In other embodiments, however, memory 52 comprises memory that is at least partially disposed exterior to POS terminal 16. Thus, in at least some embodiments, memory 54 may comprise an external database or other storage device communicatively connected to POS terminal 16.

The communications interface circuitry 58 may comprise, for example, one or more of an ETHERNET interface, a Universal Serial Bus (USB) interface, or a wireless interface, such as a WiFi interface operating according to any of the 802.XX protocols. Communications interface circuitry 58 allows POS terminal 16 to communicate data and messages with other remote devices, such as POS node 14 and peripheral device 18, using any of a variety of well-known and well-documented protocols, such as UDP and/or TCP/IP, for example. Other communication interfaces not specifically mentioned herein are also possible.

Figure 5:
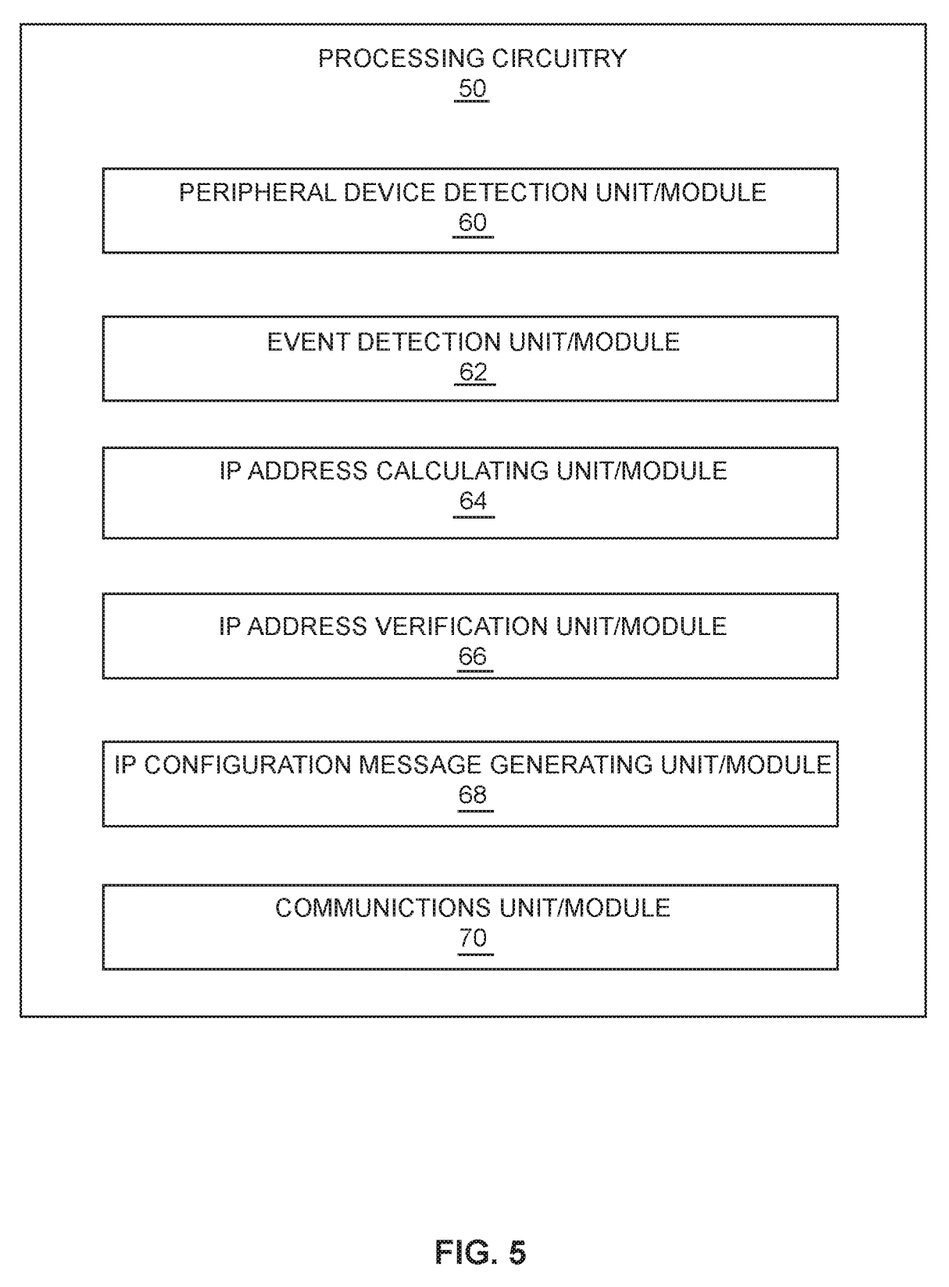
FIG. 5 is a schematic block diagram of a control application that configures a POS terminal to dynamically assign an IP address to a peripheral device according to one embodiment of the present disclosure.

FIG. 5 is a functional block diagram illustrating a control application 56 configured to control POS terminal 16 to dynamically generate and assign an IP address to peripheral device 18 according to one embodiment of the present disclosure. As seen in FIG. 5, the control application 56 comprises a peripheral device detection unit/module 60, an event detection unit/module 62, and IP address calculating unit/module 64, an IP address verification unit/module 66, an IP configuration message generating unit/module 68, and a communications unit/module 70. Each of the unit/modules comprises computer instructions that, when executed by processing circuitry 50, configure POS terminal 16 to function as previously described.

More particularly, the peripheral device detection unit/module 60 comprises instructions that, when executed by processing circuitry 50, causes POS terminal 16 to detect when a peripheral device has been communicatively connected and/or disconnected from POS terminal 16. The event detection unit/module 62 comprises instructions that, when executed by processing circuitry 50, causes POS terminal 16 to detect the occurrence of a predetermined event. The events that are detected by the peripheral device detection unit/module 60 and the event detection unit/module 62 trigger POS terminal 16 to calculate a dynamic IP address for peripheral device 18, and send that IP address to peripheral device 18, as previously described.

The IP address calculating unit/module 64 comprises instructions that, when executed by processing circuitry 50, causes POS terminal 16 to determine its own currently assigned IP address, determine a pseudo IP address, and generate an IP address for the peripheral device as a function of those two parameters. The IP address verification unit/module 66 comprises instructions that, when executed by processing circuitry 50, causes POS terminal 16 to verify that the IP address calculated by the IP address calculating unit/module 64 is a valid IP address (e.g., that the calculated IP address falls within a range of valid IP addresses). The IP configuration message generating unit/module 68 comprises instructions that, when executed by processing circuitry 50, causes POS terminal 16 to generate IP Configuration message 20 to include the IP address calculated for the peripheral device 18, as well as any other network configuration needed by peripheral device 18 to communicate with the POS network 12. The communications unit/module 70 comprises instructions that, when executed by processing circuitry 50, causes POS terminal 16 to send the IP Configuration message 20 to peripheral device 18, as well as receive data from peripheral device 18 and one or more POS nodes 14 in POS network 12.

The present embodiments may, of course, be carried out in other ways than those specifically set forth herein without departing from essential characteristics of the invention. For example, the present embodiments depict the peripheral device 18 as being a PIN pad. However, this is for illustrative purposes only. Peripheral device 18 may be any device that is to bypass POS terminal 16 to communicate customer data in a secure manner to a POS node 14 in a PS network 12. Therefore, the present embodiments are to be considered in all respects as illustrative and not restrictive, and all changes coming within the meaning and equivalency range of the appended claims are intended to be embraced therein.

What is claimed is:

1. A method of dynamically assigning an IP address to a peripheral device of a Point-Of-Sale (POS) terminal, wherein the method is implemented by the POS terminal and comprises:
    calculating an IP address for the peripheral device as a function of an IP address currently assigned to the POS terminal and a pseudo IP address determined by the POS terminal;
    generating an IP configuration message to include the calculated IP address and network configuration information that supports secure communications between the POS terminal and one or more network nodes in a network; and
    sending the IP configuration message to the peripheral device thereby configuring the peripheral device to communicate user data received by the peripheral device securely with the one or more network nodes in the network.

2. The method of claim 1 wherein the pseudo IP address comprises an offset value, and wherein calculating the IP address for the peripheral device comprises performing a mathematical operation on the IP address currently assigned to the POS terminal and the offset value.

3. The method of claim 2 further comprising verifying whether the calculated IP address falls within a predetermined range of valid IP addresses.

4. The method of claim 2 wherein the pseudo IP address is randomly generated.

5. The method of claim 2 wherein the pseudo IP address comprises a predetermined value.

6. The method of claim 1 further comprising detecting that the peripheral device has been communicatively coupled to the POS terminal.

7. The method of claim 6 further comprising calculating the IP address for the peripheral device responsive to detecting that the peripheral device is communicatively coupled to the POS terminal.

8. The method of claim 1 wherein the peripheral device is a Personal Identity Number (PIN) pad, and wherein sending the IP configuration message to the peripheral device configures the PIN pad to use the calculated IP address to securely transmit the user data to the one or more network nodes.

9. The method of claim 1 wherein the IP configuration message comprises an XML message.

10. The method of claim 1 further comprising:
    detecting a trigger event at the POS terminal; and
    responsive to detecting the trigger event:
        generating an updated IP address for the peripheral device as a function of the IP address currently assigned to the POS terminal and a different pseudo IP address; and
        sending the updated IP address to the peripheral device in another IP configuration message thereby reconfiguring the peripheral device to communicate the user data received at the peripheral device securely with the one or more network nodes in the network.

11. A Point-Of-Sale (POS) terminal operatively connected to a peripheral device and comprising:
    a communication interface communicatively connected to a computer network, and configured to communicate data with one or more network nodes and the peripheral device; and
    processing circuitry operatively connected to the communication interface and configured to:
        calculate an IP address for the peripheral device as a function of an IP address currently assigned to the POS terminal and a pseudo IP address determined by the POS terminal;
        generate an IP configuration message to include the calculated IP address and network configuration information that supports secure communications between the POS terminal and one or more network nodes in a network; and
        send the IP configuration message to the peripheral device thereby configuring the peripheral device to communicate user data received by the peripheral device securely with the one or more network nodes in the network.

12. The POS terminal of claim 11 wherein the pseudo IP address comprises an offset value, and wherein to calculate the IP address for the peripheral device, the processing circuitry is configured to perform a mathematical operation on the IP address currently assigned to the POS terminal and the offset value.

13. The POS terminal of claim 12 wherein the processing circuitry is further configured to verify whether the calculated IP address falls within a predetermined range of valid IP addresses.

14. The POS terminal of claim 12 wherein the pseudo IP address is randomly generated.

15. The POS terminal of claim 12 wherein the pseudo IP address comprises a predetermined value.

16. The POS terminal of claim 11 wherein the processing circuitry is further configured to detect that the peripheral device has been communicatively coupled to the POS terminal.

17. The POS terminal of claim 16 wherein the processing circuitry is further configured to calculate the IP address for the peripheral device responsive to detecting that the peripheral device is communicatively coupled to the POS terminal.

18. The POS terminal of claim 11 wherein the peripheral device is a Personal Identity Number (PIN) pad, and wherein by sending the IP configuration message to the peripheral device, the processing circuitry configures the PIN pad to use the calculated IP address to securely transmit the user data to the one or more network nodes.

19. The POS terminal of claim 11 wherein the processing circuitry is further configured to:
    detect a trigger event at the POS terminal; and
    responsive to detecting the trigger event:
        calculate an updated IP address for the peripheral device as a function of the IP address currently assigned to the POS terminal and a different pseudo IP address; and
        send the updated IP address to the peripheral device in another IP configuration message thereby reconfiguring the peripheral device to communicate the user data received at the peripheral device securely with the one or more network nodes in the network.

20. A non-transitory computer readable medium having a computer program stored thereon, the computer program comprising instructions that, when executed on a processing circuit of a Point-Of-Sale (POS) terminal operatively connected to a payment processing unit, configures the POS terminal to:

calculate an IP address for the payment processing unit as a function of an IP address currently assigned to the POS terminal and a pseudo IP address determined by the POS terminal;

generate an IP configuration message to include the calculated IP address and network configuration information that supports secure communications between the POS terminal and one or more network nodes in a network; and send the IP configuration message to the payment processing unit thereby configuring the payment processing unit to communicate user data received by the payment processing unit securely with the one or more network nodes in the network.

* * * * *